(12) United States Patent
Paponneau

(10) Patent No.: US 8,641,539 B2
(45) Date of Patent: Feb. 4, 2014

(54) COUPLING DEVICE FOR TRANSMITTING TORQUE

(75) Inventor: François Paponneau, Gradignan (FR)

(73) Assignee: Exosun, Martillac (FR)

(*) Notice: Subject to any disclaimer, the term of this patent is extended or adjusted under 35 U.S.C. 154(b) by 0 days.

(21) Appl. No.: 13/500,559

(22) PCT Filed: Oct. 7, 2010

(86) PCT No.: PCT/EP2010/064986
§ 371 (c)(1),
(2), (4) Date: Apr. 5, 2012

(87) PCT Pub. No.: WO2011/042490
PCT Pub. Date: Apr. 14, 2011

(65) Prior Publication Data
US 2012/0196689 A1    Aug. 2, 2012

(30) Foreign Application Priority Data
Oct. 7, 2009  (FR) ...................................... 09 56990

(51) Int. Cl.
*F16D 3/16*  (2006.01)
(52) U.S. Cl.
USPC .......................................... 464/150; 464/162
(58) Field of Classification Search
USPC ........................... 464/106, 150, 162; 403/383
See application file for complete search history.

(56) References Cited

U.S. PATENT DOCUMENTS

| | | | | |
|---|---|---|---|---|
| 3,714,841 | A | * | 2/1973 | Grosseau |
| 4,551,115 | A | * | 11/1985 | Ferguson |
| 5,085,289 | A | * | 2/1992 | Chance |
| 5,823,499 | A | | 10/1998 | Ito et al. |

FOREIGN PATENT DOCUMENTS

| | | |
|---|---|---|
| DE | 840 335 | 6/1952 |
| DE | 20 2009 013 366 U1 | 4/2010 |
| EP | 0 098 777 A2 | 1/1994 |
| FR | 348.007 A | 3/1905 |
| FR | 859.469 A | 12/1940 |
| GB | 2 138 104 A | 10/1984 |
| JP | 2004092705 | * 3/2004 |

OTHER PUBLICATIONS

European Patent Office, International Search Report in International Patent Application No. PCT/EP2010/064986 (Dec. 22, 2010).

* cited by examiner

*Primary Examiner* — Gregory Binda
*Assistant Examiner* — Josh Skroupa
(74) *Attorney, Agent, or Firm* — Leydig, Voit & Mayer, Ltd.

(57) ABSTRACT

A coupling device for transmitting torque between an input shaft and an output shaft have respective opposing ends, includes a male element and a female element for engaging with one another. One of the input shaft and the output shaft includes, at the end, the male element, a cross-section of which has a generally polygonal outer shape. The other of the input shaft and the output shaft includes, at the end, the female element, a cross-section of which has a generally polygonal inner shape complementary to the polygonal outer shape of the male element. The male and female elements engage with one another by meshing with a first functional play between them, and the male element and the shaft on which the male element is mounted have a second functional play between them. The male element and the shaft engage each other by meshing with the second functional play.

6 Claims, 3 Drawing Sheets

COUPLING DEVICE FOR TRANSMITTING TORQUE

FIELD OF THE INVENTION

The invention relates to a coupling device making it possible to transmit torque between two shafts.

BACKGROUND OF THE INVENTION

Currently, in order to transmit torque between two shafts that are not found one in the extension of the other, this connection is usually ensured using a coupling device forming a Cardan joint. Furthermore, if the distance is variable between the two shafts to be connected, one of said shafts must be telescoping. Such a coupling device comprises parts that are complex, and therefore expensive to produce.

Another solution is to use a flexible sleeve in place of the Cardan joint. Such a sleeve is made either from a deformable polymer or in the form of a metal bellows. One drawback of such a sleeve is the reliability over time with accelerated aging problems.

SUMMARY OF THE INVENTION

One aim of the invention is to provide a coupling device that is both simple and inexpensive to produce while being completely reliable over time.

To that end, the invention relates to a coupling device for transmitting torque between an input shaft and an output shaft, each of which comprises one end opposite the other, wherein one of the input shaft and output shaft comprises, at the end thereof, a male element, a section of which has a generally polygonal outer shape, and the other one of the input shaft and output shaft comprises, at the end thereof, a female element, one section of which has a generally polygonal inner shape complementary to the outer polygonal shape, both the male and female elements being intended to engage with one another by meshing with a functional play, and the male element being mounted on the end of the shaft on which the same is located, wherein a second functional play exists between the male element and the end of the shaft on which side male element is located, the male element and said end of the shaft engaging with one another by meshing with the second functional play.

Thus, the presence of the functional plays allows swiveling between the two simply while ensuring complete reliability over time.

Advantageously, but optionally, the coupling device also has at least one of the following features:

the outer polygonal shape fitting into a circle, a functional play value is below a value of a deflection at the circle on one side of the polygonal outer shape forming a chord of the circle;

the polygonal inner and outer shapes comprise between three and twelve sides;

the polygonal inner and outer shapes comprise four sides;

the male element is integral with the end of the shaft on which it is located;

the male element is attached on the end of the shaft on which is located;

a second functional play exists between the male element and the end of the shaft on which it is located;

the male element comprises one or more parts stacked against one another along the longitudinal axis of the shaft on the end of which the male element is located;

the female element forms the end of a hollow shaft with a polygonal inner section;

the female element forms a cast end of a hollow shaft with a cylindrical section;

the male element comprising a coaxial opening, the coaxial opening and an outer circumference of the end of the shaft are polygonal; and the polygonal shapes of the coaxial opening in the outer circumference comprise between three and twelve sides.

BRIEF DESCRIPTION OF THE FIGURES

Other features and advantages of the invention will appear in the following description of one embodiment of the invention. In the appended drawings.

DETAILED DESCRIPTION

Figure 1:
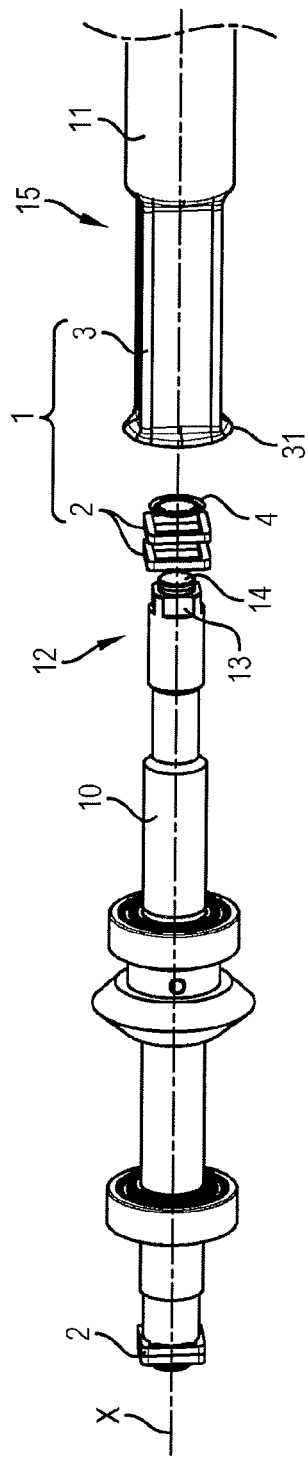
FIG. 1 is an exploded three-dimensional view of a coupling device according to the invention mounted between two shafts.

One embodiment of the coupling device 1 according to the invention will be described in reference to FIG. 1. This coupling device 1 is intended to allow the transmission of torque between an input shaft 10 and an output shaft 11. It comprises a male element 2 and female element 3, both intended to cooperate with one another by meshing.

The input shaft 10 comprises one end 12 on which the male element 2 is positioned. Here, in the embodiment illustrated in FIG. 1, the end 12 comprises, on a section, a set of flats 13, here four, uniformly distributed over a circumference of the end 12 of the input shaft 10. Protruding from the end 12 along a longitudinal axis X of the input shaft 10, a cylindrical section of revolution 14 has a diameter smaller than a distance between the two diametrically opposed flats 13. The number of flats makes it possible to define a polygonal shape in cross-section with a circumference of the end 12 of the input shaft 10. In particular, this number of flats may be between three and twelve.

In cross-section perpendicular to the longitudinal axis X, the male element has a generally polygonal outer shape. In the embodiment illustrated in the figures, the polygonal shape comprises four sides forming a square. The male element 2 here is made up of two identical parts that here assume the form of squares. Each of the parts forming the male element 2 is pierced with a coaxial opening 30, which is also square, so that the two parts forming the male element 2 can be slidingly fitted on the flats 13 of the end 12 of the input shaft 10. In general, the coaxial opening has a shape complementary to the circumference of the end 12 of the input shaft 10 on which the male element is intended to be slidingly slid. A functional play 131 exists between the flat 13 of the end 12 of the input shaft 10 and a side 24 of the coaxial opening 30 located opposite it. This play is identical between each of the flats 13 and each of the sides 24 of the coaxial opening 30 respectively opposite. This functional play 131 is chosen so that at least the input shaft 10 drives, during rotation around its longitudinal axis X, the parts of the male element 2 in said rotational movement. The parts making up the male element 2 are kept in place on the end 12 of the input shaft 10 using a ring 4 slidingly and forcibly fitted on the cylindrical section 14.

The ring 4 is of the "Grifaxe" type and is locked on the cylindrical section 14 by over-centering, once said ring 4 is in place. The ring 4 then forms a means for locking the translation along the longitudinal axis X of the male element 2 on the end 12 of the input shaft 10. In this way, the male element cannot escape the end 12 of the input shaft 10. In an alternative embodiment, the locking means comprise a circlips or a pin or any other known means making it possible to ensure translational locking along the longitudinal axis X on the flats 13 of the parts forming the male element 2 on the end 12 of the input shaft 10. Alternatively, the male element 2 comprises one or more parts.

In another alternative embodiment, the male element 2 is integral with the end 12 of the input shaft 10.

In other alternative embodiments, the male element 2 can have any polygonal shape. In particular, this polygonal shape may comprise between 3 and 12 sides. The same is true for the shape of the coaxial opening 30. In one additional alternative, the polygonal shape comprises rounded apices. The same is true for the circumference of the end 12 of the input shaft 10.

The output shaft 11 comprises an end 15 on which the female element 3 is situated. The female element 3, in cross-section perpendicular to the longitudinal axis of the output shaft, has a general polygonal inner shape that here has four sides. The female element 3 can end, as illustrated in the figures, with a flared end 31 that gives it a funnel shape. This funnel shape makes it easier to place the female element 3 on the male element 2 during mounting of the coupling device 1 according to the invention between the input shaft 10 and the output shaft 11. The polygonal shape of the female element 3 has a shape complementary to that of the male element 2 situated at the end 12 of the input shaft 10. The female element 3 here is integral with the end 15 of the output shaft 11. Furthermore, in the embodiment illustrated in the figures, the female element 3 is made by casting the end 15 of the output shaft 11, which then assumes the form of a hollow cylindrical tube of revolution. In one alternative embodiment, the female element 3 is a piece attached by welding or any other means on the end 15 of the output shaft 11.

In other alternative embodiments, the female element 3 can be of any polygonal shape. In particular, this polygonal shape may comprise between 3 and 12 sides.

In one additional alternative embodiment, the polygonal shape of the female element 3 comprises rounded apices.

Figure 2:
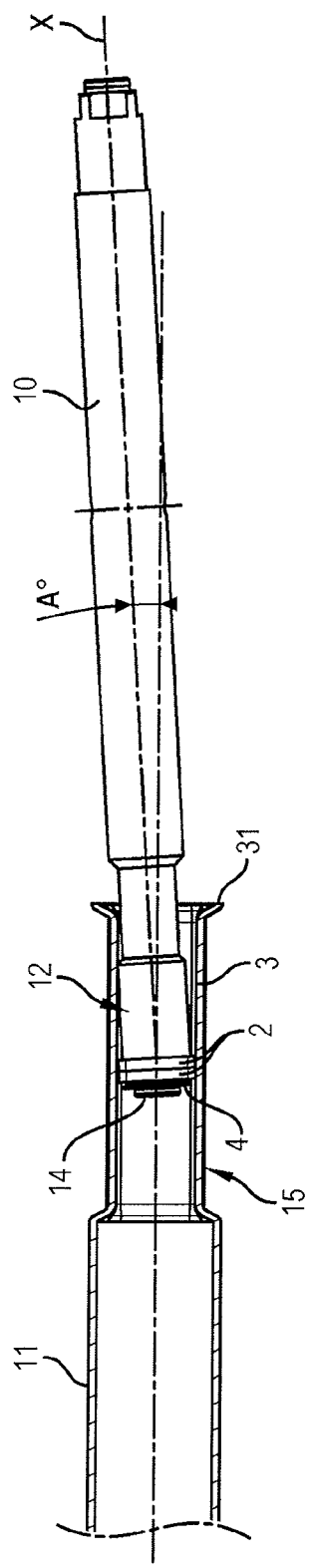
FIG. 2 is a longitudinal cross-sectional view of two shafts coupled with the coupling device according to the invention.

The operation of the coupling device 1 according to the invention will now be described in reference to FIG. 2 and FIG. 3. During mounting, the output shaft 11 is fitted on the input shaft 10 (or vice versa) so that the female end 3 receives the male end 2 in a translational movement. The shape matching between the female element 3 and the male element 2 makes it possible for the respective ends 12 and 15 of the input 10 and output 11 shafts to cooperate with one another by meshing, and thereby to transmit torque from the input shaft 10 to the output shaft 11.

Figure 3:
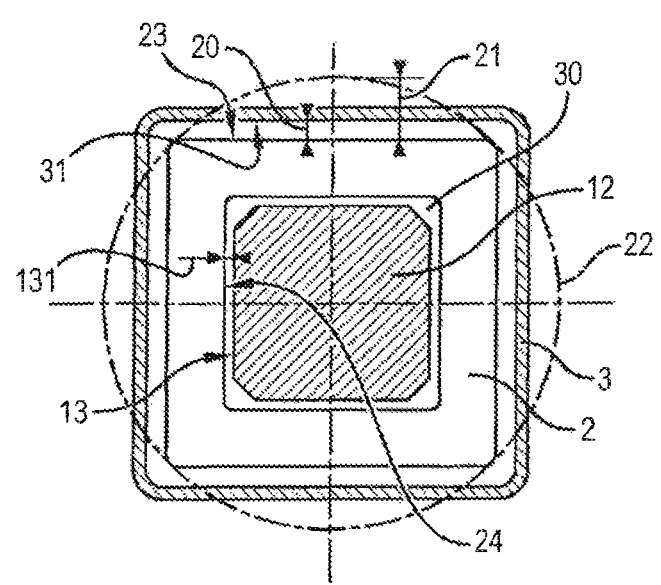
FIG. 3 is a cross section of the coupling device of FIGS. 1 and 2.

As illustrated in FIG. 3, once the male element 2 is inserted into the female element 3, a functional play 20 exists between a side 23 of the polygonal outer shape of the male element 2 and a side 31 of the polygonal inner shape of the female element 3 situated opposite the side 23 of the polygonal outer shape of the male element 2. A functional play value 20 is below a value of a deflection 21. It should be noted that this is similar regarding a functional play value 131. The deflection 21 is defined as follows:

the polygon of the polygonal outer shape of the male element 2 fits into a circle 22, the sides 23 of that polygon then form chords of said circle 22, the deflection 21 then corresponds to a segment connecting the middle of one of the chords to the circle 22, and perpendicular to that chord.

The functional play 20, associated with the functional play 131, allows swiveling between the input shaft 10 and the output shaft 11, once they are coupled, by a maximum angle A while allowing transmission by meshing of a torque between the input shaft 10 and the output shaft 11. Alternatively, a functional play value 131 is identical to that of the functional play 20. In this way, the functional plays are all identical in the coupling device 1 according to the invention.

It is possible to adapt the torque transmission capacity by acting on the number of parts making up the male element 2 and/or the number of sides of the outer polygonal shapes of the male element 2 and inner polygonal shapes of the female element 3. The value of the functional play 20 and/or the functional play 131 makes it possible to adjust the value of the maximum angle A for the swiveling allowed between the input shaft 10 and the output shaft 11, as well as to adapt the torque transmission capacity (because the more play there is, the less torque can be transmitted from the input shaft 10 to the output shaft 11). In an alternative embodiment, only one of the functional plays 20, 131 is present, the other then being quasi-zero.

Of course, many changes can be made to the invention without going beyond the scope thereof.

The invention claimed is:

1. A coupling device for transmitting torque comprising:
a first shaft and a second shaft, each of the first shaft and the second shaft having a respective longitudinal axis and an end, with the ends of the first and second shafts being couplable to each other;
a male element on the end of the first shaft, wherein the male element includes
a portion of the end of the first shaft having, in a cross-section transverse to the longitudinal axis of the first shaft, a generally polygonal outer shape, and
at least one part having an inner opening with a generally polygonal inner shape that is complementary in shape to the generally polygonal outer shape of the portion of the end of the first shaft, wherein
the at least one part is slidingly mounted on the generally polygonal outer shape of the end of the first shaft,
the inner opening of the at least one part is larger than the generally polygonal outer shape of the portion of the end of the first shaft so that a first functional play is provided between straight sides of the generally polygonal inner opening of the at least one part and straight sides of generally polygonal outer shape of the portion of the end of the first shaft, and
the at least one part includes a polygonal outer shape; and
a female element on the end of the second shaft, wherein
the female element is tubular at the end of the second shaft and has, in a cross-section transverse to the longitudinal axis of the second shaft, a polygonal inner shape complementary to the polygonal outer shape of the at least one part, and
the polygonal inner shape of the tubular female element is larger than the polygonal outer shape of the at least one part so that a second functional play is provided between straight sides of the inner shape of the tubular female part and straight sides of the polygonal outer shape of the at least one part, whereby, when the male element is inserted into and coupled to the female element and one of the first and second shafts is driven in rotation to transmit torques to the other of the first and second shafts, if the longitudinal axes of the first and second shafts are not coaxial, the first shaft swivels with respect to the second shaft.

2. The coupling device according to claim 1, wherein the female element is a die cast end of the second shaft, which is a hollow shaft with a cylindrical cross-section.

3. The coupling device according to claim 1, wherein the second functional play is smaller in magnitude than a deflection of the longitudinal axis of the second shaft with respect to the longitudinal axis of the first shaft smaller than a distance, measured in a plane transverse to the longitudinal axes of the first and second shafts, from and perpendicular to a flat side of the generally polygonal outer shape of the at least one part, at a center of the flat side of the at least one part, to a circle circumscribing and tangent to the generally polygonal outer shape of the at least one part.

4. The coupling device according to claim 1, wherein each of the generally polygonal outer shape of the end of the first shaft, the generally polygonal inner shape of the opening of the at least one part, the polygonal outer shape of the at least one part, and the polygonal inner shape of the tubular female member comprises between three and twelve sides.

5. The coupling device according to claim 1, wherein each of the generally polygonal outer shape of the end of the first shaft, the generally polygonal inner shape of the opening of the at least one part, the polygonal outer shape of the at least one part, and the polygonal inner shape of the tubular female member has four sides.

6. The coupling device according to claim 1, wherein the at least one part comprises two of the parts stacked against one another on the generally polygonal outer shape of the portion of the end of the first shaft, along the longitudinal axis of the first shaft.

* * * * *